United States Patent [19]

Dalgoutte et al.

[11] Patent Number: 4,737,026
[45] Date of Patent: Apr. 12, 1988

[54] PLURAL WAVELENGTH OPTICAL FIBRE REFLECTOMETER

[75] Inventors: David G. Dalgoutte, Ormskirk; Talal I. Y. Allos, Herts, both of Great Britain

[73] Assignee: STC PLC, London, England

[21] Appl. No.: 902,237

[22] Filed: Aug. 28, 1986

[30] Foreign Application Priority Data

Aug. 29, 1985 [GB] United Kingdom ............... 8521518

[51] Int. Cl.[4] .......................................... G01N 21/88
[52] U.S. Cl. ......................................... 356/73.1
[58] Field of Search ............................. 356/73.1

[56] References Cited

U.S. PATENT DOCUMENTS 4,397,551  8/1983  Bage et al. .................. 356/73.1
4,529,312  7/1985  Pavlath et al. ............... 356/350

Primary Examiner—Vincent P. McGraw
Attorney, Agent, or Firm—Lee, Smith & Zickert

[57] ABSTRACT

A dual wavelength reflectometer for single mode fibre is provided with separate lasers (5, 6) with emission wavelengths at 1300 and 1550 nm whose outputs are combined using a single mode optical fibre wavelength multiplexer (7) of tapered coupler format. The combined output is fed to a single mode optical fibre beam splitter (9), also of tapered coupler format, which is constructed to act as a 3 dB splitter for both wavelengths. This beam splitter directs light from the lasers into the fibre under test (10) and back-scattered light from the test fibre n to a photodetector (11).

3 Claims, 2 Drawing Sheets

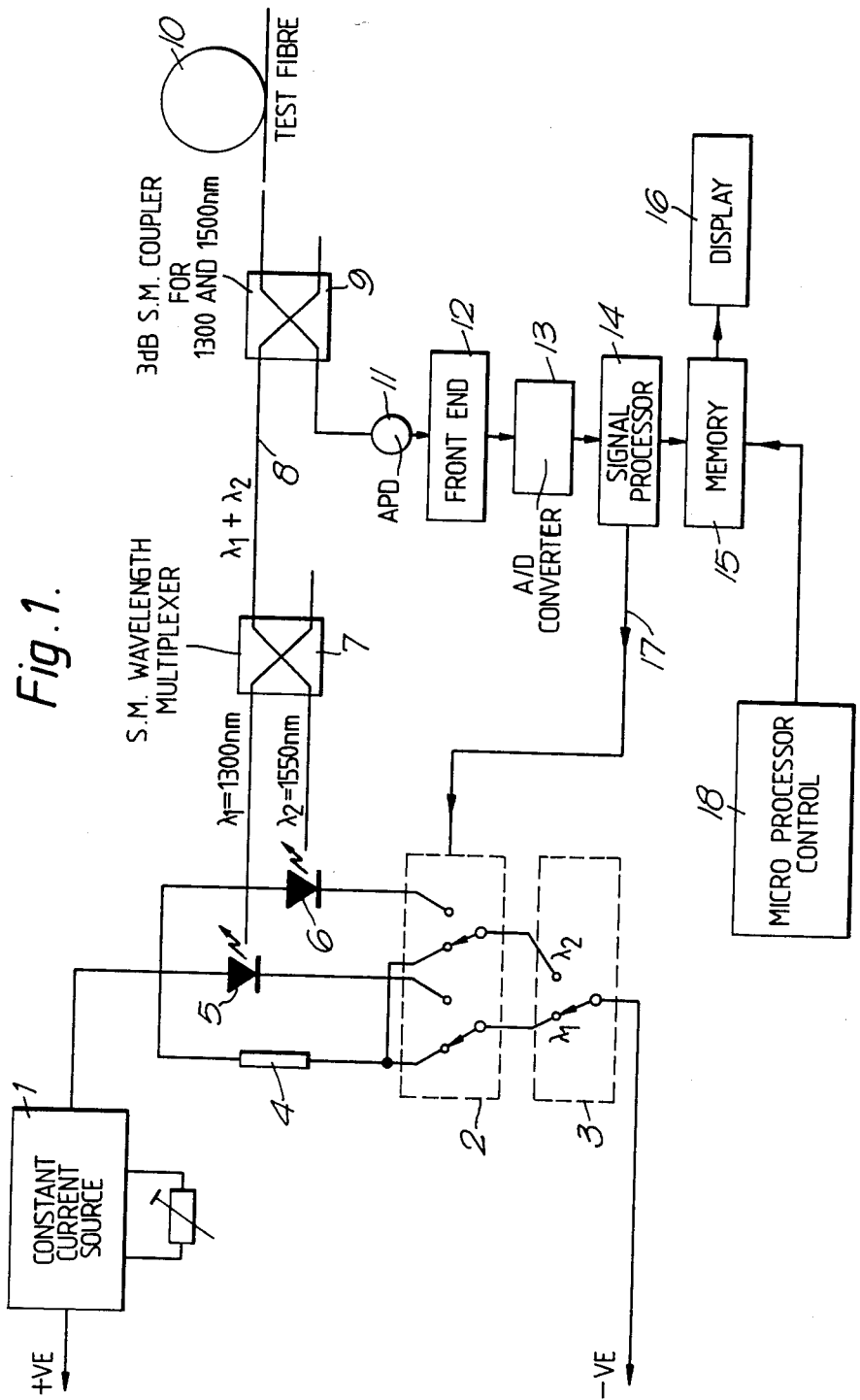

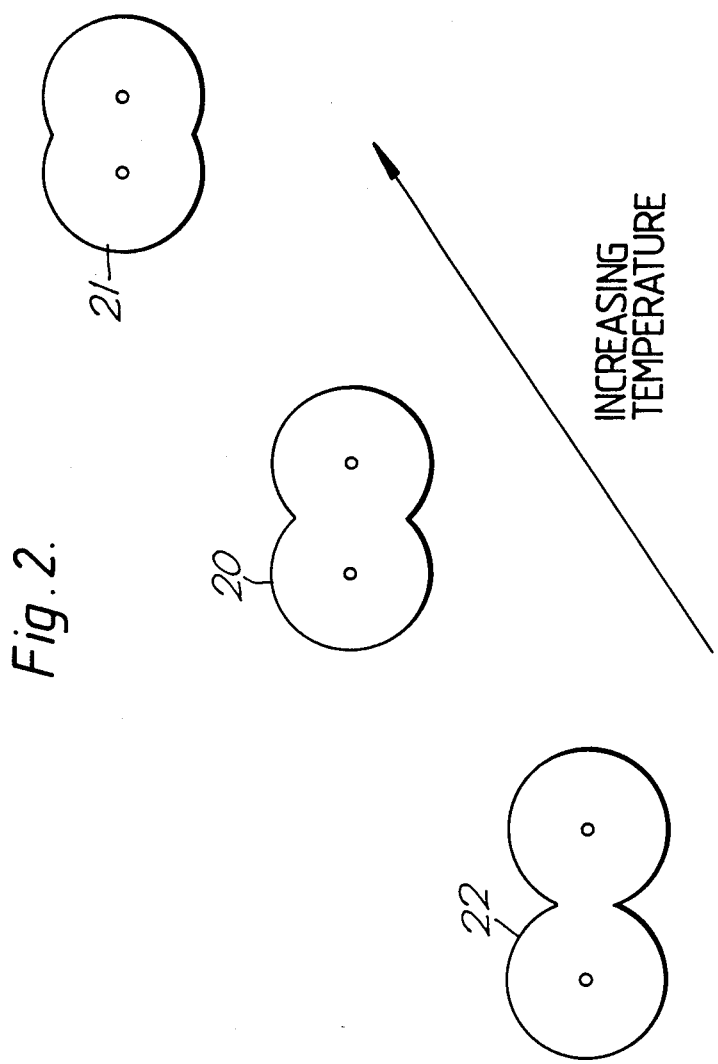

PLURAL WAVELENGTH OPTICAL FIBRE REFLECTOMETER

This invention relates to optical fibre reflectometers, and is particularly concerned with a design of reflectometer designed for single-mode operation at two or more different wavelengths, typically, though not essentially, one in the region of 1300 nm and the other in the region of 1550 nm so as to be able to afford measurements in the optical windows centred at these respective wavelengths that are exhibited by certain types of vapour deposited silica optical fibre.

The principal of operation of a conventional optical fibre reflectometer is that intense short duration pulses of light, typically from a laser, are launched through a beam splitter and into one end of the optical fibre under test. Back-scattered light returning up the test fibre back into the reflectometer is directed by the beam splitter on to a photodetector. The detector receives, after each pulse of the light source, an extended pulse of back-scattered light. Near the leading edge of the back-scattered pulse the light is relatively intense as this is light back-scattered from regions near the front end of the test fibre. Later portions of the back-scattered pulse are progressively weaker because of the attenuation provided by the test fibre both on the outward journey down that fibre and again on the return path. Signal-to-noise ratio is improved by examining the return from not just one pulse but that from a whole sequence of pulses. For this purpose the output of the photodetector is range-gated, and the samples are conveniently converted into digital signals enabling signal processing by summing the responses for each given range sample for some arbitrary number of pulses. In a refinement of this reflectometry technique a further improvement in signal-to-noise ratio is provided by the use of coherent detection. Typically this involves tapping off a portion of the light from the source, frequency shifting the remainder for instance with a Bragg cell, and then interfering at the detector the frequency shifted back-scattered signal with the tapped-off portion of light which constitutes a 'local oscillator' signal for heterodyne detection.

The beam splitter, which is used both to direct the light from the source into the test fibre, and to direct the back-scattered light from that test fibre onto the photodetector, needs to be a device with as low an insertion loss as is conveniently possible. This criterion is satisfied by a 4-port 3 dB tapered optical fibre coupler made by the technique described in patent specification No. GB 2150703A. An inherent characteristic of such couplers is that the amount of coupling is a function of wavelength. At some particular wavelength all the power launched into one of its input ports will be delivered to a particular one of its output ports, hereafter referred to as the first output port. As the wavelength is progressively shortened, so at first less and less power is coupled into this first output port. In due course the 3 dB point is reached at which the power is equally divided between both output ports. Later the condition is reached at which none of the power is delivered to the first output port, but instead all is delivered to the other. Then, as the wavelength is shortened still further, progressively more power begins once again to be coupled into first output port. Eventually all the power is again coupled into the first output port. If the wavelength continues to be shortened the cycle is repeated.

For any given wavelength of light a similar oscillation in the coupling of the power first to one output port, then to the other, next to one output, and so on, occurs as the coupling strength of the coupler is progressively increased during the course of its manufacture. When using the method of the above-referenced patent specification in the making of a 3 dB coupler for a particular wavelength, this transfer of output power between the two output ports is monitored while the coupling between the two fibres is being progressively increased in a controlled manner. This allows the process to be halted at the appropriate time to give the requisite 3 dB coupling. The resulting coupler will function as a 3 dB coupler not only at the requisite wavelength, but also at certain other specific wavelengths. However, just simply to make a 3 dB coupler in this way for operation at say 1300 nm proves no guarantee that it will also function as a 3 dB coupler at some other specific wavelength, say 1550 nm.

According to the present invention there is provided an optical fibre reflectometer provided with a branched single mode optical transmission path that includes a tandem arrangement of first and second single mode optical couplers, wherein the first coupler is constructed to direct into the same output thereof the light from two or more different lasers with different emission wavelengths launched into different inputs thereof, and wherein the second coupler is constructed to function as a plural wavelength beam-splitter affording substantially the same relative coupling between its ports for each of the two laser emission wavelengths.

The invention also provides a single mode fibre reflectometer which reflectometer includes, means for launching pulses of light in one direction through an optical fibre beam splitter to an output port for optical coupling to one end of an optical fibre under test by the reflectometer;

a photodetector optically coupled with the beam splitter to receive light returning through the beam splitter from said fibre under test;

and processing means for processing the output of the photodetector to provide a signal indicative of the amount of back-scatter in the fibre under test expressed as a function of position down the length of the test fibre;

wherein said reflectometer is constructed for operation at two or more specific wavelengths, wherein the beam splitter is constructed to provide substantially the same coupling coefficients at each of the specific wavelengths, wherein the reflectometer further includes a separate optical source for each of the wavelengths, and wherein the outputs of the sources are directed through separate single mode optical fibres to a single mode optical fibre wavelength multiplexing coupler from which those outputs are directed through a single single mode fibre to the beam splitter.

There follows a description of a reflectometer embodying the present invention in a preferred form for two wavelength operation. The description refers to the accompanying drawings in which FIG. 1 is a block diagram of the reflectometer, and
FIG. 2 depicts cross-section of single mode couplers made at different temperatures for use in the reflectometer of FIG. 1.

Referring now to FIG. 1, a constant current source 1 is arranged, under the direction of an electronically controlled switch 2 and a further switch 3, to deliver its power either into a dummy load 4, a laser 5 with an emission wavelength of 1300 nm, or a laser 6 with an emission wavelength of 1550 nm. Light from these two lasers is ducted by single mode fibres to a single mode wavelength multiplexing coupler 7 which directs light of both wavelengths via a common channel, constituted by a single mode fibre 8, to a single mode coupler 9 which functions as a 3 dB coupler both at 1300 nm and 1550 nm. Light launched through this coupler 9 from the multiplexer 7 into one of its output ports is coupled into one end of a length 10 of optical fibre to be tested with the aid of the reflectometer. Half the returning back-scattered light returning into the coupler 9 from the test fibre 10 is directed by the coupler on to a photodetector constituted by an avalanche photodiode 11 The electrical signal output of the photodetector is amplified and sampled in a front end unit 12. The samples are put into digital form by an A to D converter 13. A signal processor 14 functions as a parallel integrator to form a sum of each digital sample produced from the back-scatter signal resulting from the first light pulse with its counterparts produced with succeeding light pulses. These sums are transferred to a memory unit 15 for relay to a display unit 16. The signal processor also provides an output on line 17 to control the operation of switch 2 in order to produce the laser light pulses. Switch 3 functions as a wavelength selector to determine which of the two lasers is to be pulsed. Synchronisation and control of the signal processor 14, of the sampling provided by the front end unit 12, and of the memory and display units 15 and 16 is provided by a microprocessor control unit 18.

The 3 dB coupler 9 is made by the method described in patent specification No. GB 2150703A which involves subjecting a pair of optical fibres, in this instance single mode fibres, in side-by-side contact to a succession of drawing operations produced by traversing the fibres longitudinally through a flame whilst stretching them between a pair of carriages to which the fibres are clamped, these carriages being driven at slightly different speeds. As explained above, this method can be used to produce a coupler that will function as a 3 dB coupler at one specific wavelength. It will also function as a 3 dB coupler for certain other specific wavelengths, but the spacing between these specific wavelengths is normally indeterminate. However, this method of manufacture is found to provide reproduceable results in terms of wavelength spacing provided that the drawing temperature is the same in each instance. Furthermore, it is found that if the drawing temperature is increased by increasing the gas feed to the burner then the wavelength spacing is decreased, whereas if the drawing temperature is reduced the spacing is increased. The reason for this phenomenon is that the drawing temperature affects the cross sectional shape of the coupler. A change of cross-section changes the model dispersion characteristics of the coupler, and hence the form of the wavelength dependence. Referring to FIG. 2, an increase in temperature will modify the cross-sectional profile from that depicted at 20 towards that depicted at 21, whereas a decrease will modify it towards that depicted at 22. Therefore, though the first manufacture of a 3 dB coupler will not be general result in the production of an acceptable product, insofar as it exhibits the wrong wavelength spacing; by a process of successive approximation in the adjustment of the drawing temperature, it is possible, after a small number of trials, to produce a coupler that does indeed exhibit the required wavelength spacing. The same process is also employed in the manufacture of the single mode wavelength multiplexer 7.

Although the foregoing description has related to a reflectometer that does not employ coherent detection of light, it should be clearly evident that the invention is also applicable to those that do. In this case two further single mode optical fibre dual wavelength beam splitters will be required, one to tap off optical power to provide a 'local oscillator' signal, and the other to heterodyne this local oscillator signal with the back-scatter signal received from the fibre under test and directed by the 3 dB beam splitter towards the photodetector.

We claim:

1. An optical fibre reflectometer provided with a branched single mode optical transmission path that includes a tandem arrangement of first and second single mode optical couplers, wherein the first coupler is constructed to direct into the same output thereof the light from two or more different lasers with different emission wavelengths launched into different inputs thereof, and wherein the second coupler is constructed to function as a plural wavelength beam-splitter affording for each of said two or more laser emission wavelengths substantially different strengths of coupling while providing substantially equal divisions of power between the outputs of the second coupler.

2. A single mode fibre reflectometer which reflectometer includes,
    means for launching pulses of light in one direction through an optical fibre beam splitter to an output port for optical coupling to one end of an optical fibre under test by the relectometer;
    a photodetector optically coupled with the beam splitter to receive light returning through the beam splitter from said fibre under test;
    and processing means for processing the output of the photodetector to provide a signal indicative of the amount of back-scatter in the fibre under test expressed as a function of position down the length of the test fibre;
    wherein said reflectometer is constructed for operation at two or more specific wavelengths, wherein the beam splitter is constructed to provide substantially different strengths of coupling coefficients at each of the specific wavelengths, but substantially the same division of power between its outputs, wherein the reflectometer further includes a separate optical source for each of the specific wavelengths, and wherein the outputs of the sources are directed through separate single mode optical fibres to a single mode optical fibre wavelength multiplexing coupler from which those outputs are directed through a single single mode fibre to the beam splitter.

3. An optical fibre reflectometer as claimed in claim 1 or 2 wherein the reflectometer is constructed as a dual wavelength reflectometer.

* * * * *